United States Patent [19]

Thompson

[11] 3,760,983

[45] Sept. 25, 1973

[54] MEASURING AND DISPENSING DEVICE FOR GRANULATED MATERIALS AND THE LIKE

[76] Inventor: Bernard C. Thompson, 3245 W. Altadine Ave., Phoenix, Ariz. 85029

[22] Filed: June 20, 1972

[21] Appl. No.: 264,429

[52] U.S. Cl.................................. 222/90, 222/455
[51] Int. Cl............................................... B67b 7/26
[58] Field of Search..................... 222/454, 455, 456, 222/89, 90, 567

[56] References Cited
UNITED STATES PATENTS

| | | | |
|---|---|---|---|
| 2,523,426 | 9/1950 | Gray | 222/455 X |
| 2,650,739 | 9/1953 | Boydstun | 222/455 X |
| 2,791,352 | 5/1957 | Roper | 222/456 UX |
| 2,853,213 | 9/1958 | Buehlig | 222/455 |
| 547,334 | 10/1895 | Gram | 222/456 |

Primary Examiner—Robert B. Reeves
Assistant Examiner—Joseph J. Rolla
Attorney—William R. Jacox et al.

[57] ABSTRACT

A hopper has an internal baffle defining upper and lower chambers and is attached to a wall of a cardboard box-like container of granulated material by a pointed opening member which projects from the hopper and is effective to pierce a V-shaped opening within the container. The hopper is secured to the container by the opening member and a clamping member which cooperates with a projecting guide member to clamp the top wall of the container. Measured amounts of material are successively trapped within the upper hopper chamber and transferred to the lower hopper chamber for dispensing in response to reverse tilting of the container and hopper. The baffle member is adjustable to provide for changing the measured amount of material which is dispensed.

6 Claims, 10 Drawing Figures

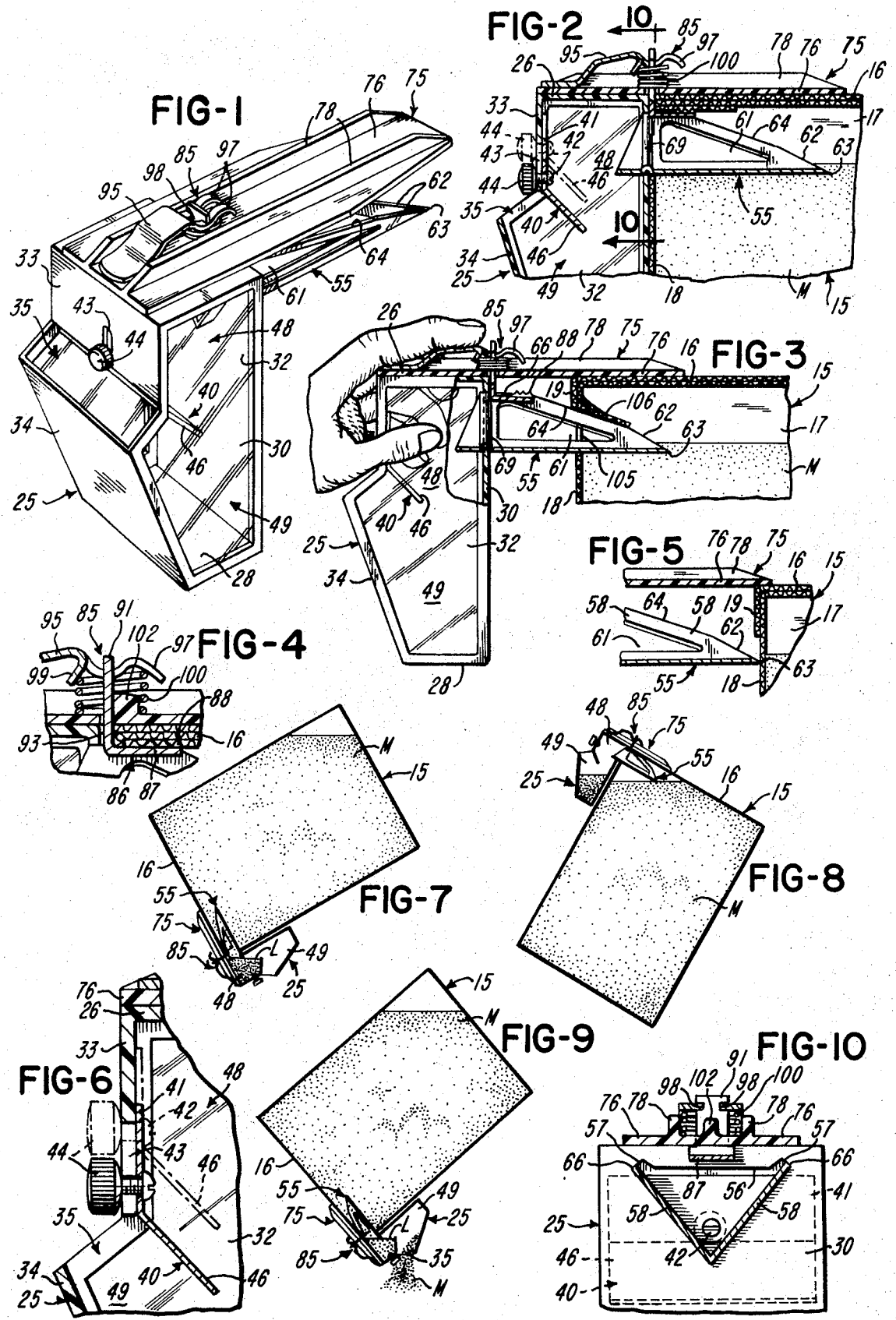

MEASURING AND DISPENSING DEVICE FOR GRANULATED MATERIALS AND THE LIKE

BACKGROUND OF THE INVENTION

In the art of devices for dispensing measured or metered quantities of a granular material, for example, as disclosed in U.S. Pat. Nos. 2,676,734, 2,853,213 and 3,258,177, it is desirable to provide a device which may be quickly and conveniently mounted on or attached to cardboard boxes or containers of various sizes. This feature is especially desirable when the device is used for dispensing granulated soap material which is marketed in cardboard boxes of various sizes such as small, giant, and king-size boxes. It is also desirable for the dispensing device to provide for forming its own opening within the box and to be positively secured to the box in sealed relation so that the device does not become accidentally detached, or the granulated material does not seep between the box and the dispensing device.

As is apparent after reviewing the disclosures of the above patents, the first patent discloses a dispenser which is formed as an integral part of a container. The second patent shows a dispenser which is adapted to be mounted on a box of predetermined width after the box is opened, and the third patent discloses a dispensing device which is mounted on the upper end portion of a cylindrical container after a notch or opening is cut within the container. Thus the dispensing device disclosed in each of the latter two patents, must be constructed for use on a container of particular size and which is provided with a prepared opening of predetermined size.

SUMMARY OF THE INVENTION

The present invention is directed to an improved device which is ideally suited for dispensing granular material such as granulated soap, sugar, salt and coffee from box-like containers, but which may also be used for dispensing other flowable solid materials. The dispensing device of the invention provides all of the desires advantages mentioned above, and particularly is adapted to be mounted on box-like containers of various sizes and to provide for quickly and conveniently forming an opening within the upper portion of the container. The dispensing device also provides for a positive and sealed attachment with the container and may be conveniently adjusted for selecting the measured quantity of material which is dispensed with each tilting movement of the container.

In accordance with a preferred embodiment of the invention, a hopper includes top and bottom walls which are integrally connected by a rear wall and parallel transparent side walls. A vertical upper front wall cooperates with an incline lower front wall to define an outlet, and a baffle member is adjustably mounted on the upper front wall to efine an upper chamber and a lower chamber within the hopper. An elongated V-shaped opening member projects rearwardly from the rear wall of the hopper and has tapered or sloping upper cutting edges for piercing a V-shaped hole or opening within a box-like container adjacent the top wall. The opening member is guided by an overlying support member which projects rearwardly from the upper wall of the hopper and is adapted to seat on the top wall of the container.

A spring-biased clamping member positively secures the hopper to the container and clamps the pierced portion of the container against the top wall of the container. With each tilting movement of the container and attached dispensing device, the upper hopper chamber automatically measures or traps a preselected quantity of granular material, and the lower hopper chamber dispenses the measured quantity of material which it previously received from the upper hopper chamber when the container was returned to its upright position.

Other features and advantages of the invention will be apparent from the following description, the accompanying drawing and the appended claims.

BRIEF DESCRIPTION OF THE DRAWING

FIG. 1 is a perspective view of a measuring and dispensing device constructed in accordance with the invention;

FIG. 2 is a fragmentary vertical section of the device shown in FIG. 1 and illustrating its attachment to a box-like container of granular material;

FIG. 3 is a side elevational view of the device with portions broken away and illustrating how it is attached to a container;

FIG. 4 is an enlarged fragmentary section of the container clamping mechanism shown in FIG. 2 and illustrating its engagement with the container;

FIG. 5 is a fragmentary section of the device and illustrating its position relative to the container prior to attachment;

FIG. 6 is an enlarged fragmentary section of a portion of the device shown in FIG. 2;

FIGS. 7-9 are diagrammatic views of a container and attached dispensing device and illustrating the use and operation of the device; and FIG. 10 is a slightly enlarged fragmentary section taken generally on the line 10—10 of FIG. 2.

DESCRIPTION OF THE PREFERRED EMBODIMENT

The measuring and dispensing device shown in FIG. 1 is adapted to mount on a folded cardboard box-type container 15 which commonly has a top wall 16, parallel side walls 17 and parallel end walls 18. Usually, a substantial portion of the top wall 16 has a double wall thickness as a result of the overlapping flaps of the side walls which form the top wall. In addition, the top wall 16 usually has a triple wall thickness at each end as a result of an additional flap extending from the corresponding end wall 18 and which is glued to the overlapping top wall flaps. It is also common for one of the overlapping top wall flaps to have depending flaps which are glued to the upper ends of the corresponding end walls 18 to produce a double wall thickness at the upper ends of the end walls 18 as indicated at 19 in FIG. 3. The container 15 illustrated is provided with a granular soap material M which is usually filled to a level somewhat below the top wall 16 of the container.

Referring to FIGS. 1-3, the illustrated measuring and dispensing device includes a hopper 25 which is preferably injection molded of a thermoplastics material and includes a rectangular top wall 26 and a rectangular bottom wall 28 which are integrally connected by a rectangular rear wall 30 and parallel side walls 32. The hopper 25 also includes a vertical upper front wall 33 and a lower front wall 34 which slopes upwardly and forwardly from the bottom wall 28. The upper front wall 33 and the lower front wall 34 cooperate to define a rectangular discharge outlet 35 which extends between the side walls 32. preferably, at least the side walls 32 are formed of a transparent plastics material for viewing into the hopper 25.

A baffle member 40 is disposed within the hopper 25 and includes a flat upper portion 41 which is releasably secured to the upper front wall 33 of the hopper 25 by a screw 42. The screw 42 extends through a vertical slot 43 formed within the upper front wall 33 and receives a nut 44 adapted to be tightened by the fingers. The baffle member 40 also includes a lower portion 46 which projects downwardly from the upper portion 41 and inwardly to divide the hopper into an upper compartment or chamber 48 and a lower compartment or chamber 49. The slot 43 provides for vertical adjustment of the baffle member 40 after the nut 44 is released, between a lower position as shown by the full lines in FIG. 2 and an upper position as shown by the dotted lines in FIG. 2. This adjustment of the baffle member 40 provides for adjusting the volume of the upper hopper chamber 48 for a purpose which will be explained later.

An elongated cutter or opening member 55 is supported by the rear wall 30 of the hopper 25. The opening member 55 extends through a generally triangular inlet or opening 56 (FIG. 10) which is formed within the rear wall 30 and has upper corner notches 57. As shown, the opening member 55 is formed from sheet metal and includes a pair of converging walls 58 each having a generally triangular configuration and arranged to form a generally V-shaped cross-sectional configuration as shown in FIG. 10. Each of the walls 58 has a triangular aperture or opening 61 and inclined leading cutting edges 62 which converge to form a sharp point 63. A cutting edge 64 extends from each of the cutting edges 62, but at a slightly lesser incline than the corresponding cutting edge 62.

The cutting edges 64 extend to corresponding upper horizontal edges 66 which are received within the corresponding notches 57 forming the upper corner of the opening 56. The inner portion of the opening member 55 projects into the upper hopper chamber 48, and a groove-like recess 69 is formed within each of the walls 58 for receiving the corresponding edge defining the opening 56.

The opening member 55 is mounted on the hopper 25 by first compressing the upper portions of the walls 58 together. The inner end portion is then inserted into the opening 56, after which the walls 58 are released so that the edges 66 spring outwardly and wedge within the notches 57. An elongated support or guide member 75 projects rearwardly from the upper wall 26 of the hopper 25 into overlying relation with the opening member 55. The guide member 75 includes a flat base wall 76 which is somewhat wider (FIG. 10) than the opening member 55 to serve as a guard for the cutting edges 64, and the wall 76 is reinforced by a pair of parallel spaced ribs 78 molded as an integral part of the base wall 76. The base wall 76 has tapered leading edges 79 which converge to the leading forward ends of the ribs 78.

A clamping means or mechanism 85 includes an L-shaped clamping member 86 consisting of horizontal leg portion 87 having upwardly projecting teeth or serrations 88 along its edges. The clamping member 86 also includes a leg portion 91 which projects upwardly through a slot 93 formed within the base wall 76 of the support member 75. An actuating member 95 is formed of sheet metal and is positioned between the ribs 78 of the support member 75. The actuating member 95 includes a pair of rearwardly projecting fingers 97 which extend through corresponding notches 98 formed within opposite edges of the leg portion 91 of the clamping member 86. As shown in FIG. 4, each of the fingers 97 of the actuating member 95 has an S-shaped curved configuration and cooperates with a center return flange 99 for retaining the actuating member 95 on the clamping member 86 and for confining a compression coil spring 100. The spring 100 surrounds the upwardly projecting leg portion 91 of the clamping member 86 and also a stud 102 which projects upwardly from the base wall 76 of the support member 75.

The measuring and dispensing device described above is installed or mounted on a container 15 in the following manner. The rearward end portion of the support member 75 is seated on the top wall 16 of the container 15 (FIG. 5) so that the point 63 of the opening member 55 contacts one of the end walls 18 of the container 15. The actuating member 95 is then depressed against the bias of the spring 100 so that the lower serrated leg portion 87 of the clamping member 86 is moved or shifted to a lower position as shown in FIG. 3. The device is then pressed firmly towards the container 15 so that the opening member 55 pierces the end wall 18 and forms a triangular shaped opening 105 within the end wall 18. As the opening 105 is formed, a corresponding flap portion 106 (FIG. 3) is forced upwardly by the sloping or tapered cutting edges 62 and 64 of the opening member 55.

When the opening member 55 is fully inserted into the container 15, and the rear wall 30 of the hopper 25 engages the adjacent end wall 18 of the container 15, the actuating member 95 is released so that the clamping member 86 retracts upwardly and clamps the flap portion 106 of the container wall 18 against the top wall 16 of the container as shown in FIG. 4. The press fit relation of the opening member 55 within the end wall 18 of the container 15, and the gripping force exerted between the clamping member 86 and the guide or support member 75 against the top wall 16 of the container 15, are effective to secure the dispensing device positively to the container 15.

To use the measuring and dispensing device, the container 15 is tilted counter-clockwise as illustrated in FIG. 7 so that a portion of the granular material M flows through the apertures 61 within the opening member 55 and into the upper compartment or chamber 48 of the hopper 25. When the granular material M reaches the level L (FIG. 7) within the upper chamber 48 of the hopper 25, the inner open end of the opening member 55 is closed or trapped by the material M so that the material ceases to flow through the opening 105 within the container 15. When the container 15 is tilted in the opposite direction or back to a generally normal upright position, as generally indicated in FIG. 8, the volume of material trapped within the upper hopper chamber 48, flows downwardly into the lower chamber 49 of the hopper 25.

Thus when the container 15 is again tilted in a counterclockwise direction as illustrated in FIG. 9, the volume of material M within the lower hooper chamber 49, is poured from or dispensed through the outlet 35 as illustrated in FIG. 9. While this predetermined quantity of material M is being dispensed, an equal amount of material M flows into the upper hopper chamber 48, as mentioned above in connection with FIG. 7. Thus predetermined charges or quantities of material M are successively dispensed from the device in response to alternately tilting the container 15 in opposite directions as illustrated in FIGS. 7–9.

From the drawing and the above description, it is apparent that a measuring and dispensing device constructed in accordance with the present invention, provides desirable features and advantages. For example, the device is adapted to be mounted on various sizes of cardboard box-like containers, regardless of the height and width of the containers. The dispensing device is also adapted to form its own opening within the container as illustrated in connection with FIG. 3 by piercing an opening 105 within a wall of the container. The lesser incline or slope of the cutting edges 64 of the opening member 55, relative to the leading cutting edges 62, is desirable to provide for shearing or cutting of the opening 105 within the double wall portion 19 of the container 15 without tearing the container. In addition, the support member 75 serves as both a guide and a protector for the opening member 55.

Another important advantage is provided by the clamping member 86 which aids in securing the dispensing device to the container 15 and assures that the flap portion 106 is prevented from returning to a position closing the opening 105. The adjustable baffle member 40 also provides for changing the volume or quantity of material M which is dispensed with each tilting movement of the container. That is, by simply releasing the nut 44 and adjusting the vertical position of the baffle member 40, a corresponding adjustment is made in the amount of material which is trapped within the upper chamber 48 of the hopper 25 when the container 15 is tilted to the position illustrated in FIG. 7. Preferably, this amount is approximately one half cup when the baffle member 40 is located at its mid-position.

While the form of measuring and dispensing device herein described constitutes a preferred embodiment of the invention, it is to be understood that the invention is not limited to this precise form of device, and that changes may be made therein without departing from the scope and spirit of the invention.

The invention having thus been described, the following is claimed:

1. A device adapted to be mounted on a box-like container of granular material for dispensing a predetermined quantity of the material, comprising a hopper having top and bottom walls connected by a rear wall, a baffle member while said hopper and cooperating therewith to define an upper chamber and a lower chamber, said hopper also including a front wall having means defining an outlet for said lower chamber intermediate said top and bottom walls, means defining an inlet within said rear wall for said upper chamber, an opening member projecting from said hopper adjacent said inlet and adapted to be inserted into a wall of the container to form an opening therein by folding a flap portion into the containter, a guide member projecting from said top wall of said hopper in the same direction as said opening member for guiding the opening member into the wall of the container, a clamping member positioned adjacent said rear wall between said guide member and said opening member, spring means for urging said clamping member towards said guide member to effect gripping of the top wall of the container for securing the device to the container, said clamping member also being effective to press the flap portion against the top wall of the container, means for actuating said clamping member, and said hopper being effective to receive and trap a predetermined quantity of material within said upper chamber and to dispense the material within said lower chamber through said outlet when said hopper and container are tilted from an upright position and to provide for gravity transfer of the material within said upper chamber to said lower chamber when said hopper and container are returned to the upright position.

2. A device as defined in claim 1 wherein said opening member has a generally V-shaped cross-sectional configuration and includes upper cutting edges which slope downwardly from said hopper, each of said cutting edges includes outer and inner portions, and said inner portions of said cutting edges having a lesser slope than said outer portions to facilitate cutting a multiple wall portion of the container.

3. A device as defined in claim 1 wherein said opening member comprises converging walls having a pointed tip, and means defining apertures within said walls to provide for a smooth and uniform flow of material from the container into said hopper.

4. A device as defined in claim 1 wherein said clamping member comprises a generally L-shaped configuration and is supported for movement adjacent said inlet, and a spring-biased actuator connected to move said element.

5. A device as defined in claim 1 wherein said baffle member includes a first portion and a second portion disposed in angular relation, said first portion is slidably supported by said hopper, and said second portion projects into said hopper to define said upper and lower chambers.

6. A device as defined in claim 1 wherein said front wall includes an upper front wall and a lower front wall defining said outlet therebetween, and said lower front is inclined upwardly from said bottom wall and projects forwardly of said upper front wall.

* * * * *